(12) United States Patent
Moncomble

(10) Patent No.: US 8,983,040 B2
(45) Date of Patent: Mar. 17, 2015

(54) METHOD AND DEVICE FOR CONSULTING A VOICE MESSAGE

(71) Applicant: France Telecom, Paris (FR)

(72) Inventor: Ghislain Moncomble, Lannion (FR)

(73) Assignee: France Telecom, Paris (FR)

( * ) Notice: Subject to any disclaimer, the term of this patent is extended or adjusted under 35 U.S.C. 154(b) by 10 days.

(21) Appl. No.: 13/629,095

(22) Filed: Sep. 27, 2012

(65) Prior Publication Data

US 2013/0083907 A1 Apr. 4, 2013

(30) Foreign Application Priority Data

Sep. 29, 2011 (FR) ...................................... 11 58751

(51) Int. Cl.
*H04M 1/64* (2006.01)
*H04M 3/533* (2006.01)

(52) U.S. Cl.
CPC .................................. *H04M 3/53333* (2013.01)
USPC ..................................... 379/88.22; 379/88.18

(58) Field of Classification Search
CPC .. H04M 3/53325; H04M 3/493; H04M 3/533
USPC ........................................... 379/88.18, 88.22
See application file for complete search history.

(56) References Cited

U.S. PATENT DOCUMENTS

| | | | |
|---|---|---|---|
| 5,146,487 A | 9/1992 | Bergsman et al. | |
| 7,212,614 B1 * | 5/2007 | Burg et al. | 379/88.18 |
| 7,899,161 B2 | 3/2011 | Katkam et al. | |
| 2004/0042595 A1 | 3/2004 | Davis et al. | |
| 2005/0037739 A1 | 2/2005 | Zhong | |
| 2005/0086316 A1 | 4/2005 | Chen | |
| 2007/0244700 A1 | 10/2007 | Kahn et al. | |

FOREIGN PATENT DOCUMENTS

| | | |
|---|---|---|
| EP | 1117242 A2 * | 7/2001 |
| WO | 02054803 A1 | 7/2002 |
| WO | 2007058522 A1 | 5/2007 |

OTHER PUBLICATIONS

French Search Report and Written Opinion dated May 11, 2012 for corresponding French Application No. 1158754, filed Sep. 29, 2011.
French Search Report and Written Opinion dated May 22, 2012 for corresponding French Application No. 1158751, filed Sep. 29, 2011.

* cited by examiner

*Primary Examiner* — Fan Tsang
*Assistant Examiner* — Van D Huynh
(74) *Attorney, Agent, or Firm* — David D. Brush; Westman, Champlin & Koehler, P.A.

(57) ABSTRACT

A method for consulting a voice message received and a method for providing a compounded voice message. The compounded voice message is composed of at least one first and one second voice component and is associated with a group of items of information relating to the voice components. The method for consultation includes reading at least one voice component of the voice message, detecting at least one user interaction concomitant upon the reading of the at least one voice component, sending at least one signal relating to the interaction detected, and receiving a command of an action to be performed relating to a voice component read from the voice message and to at least one item of information of the group of items of information associated with the voice message. Also provided is a device implementing the method for consulting a compounded voice message.

12 Claims, 2 Drawing Sheets

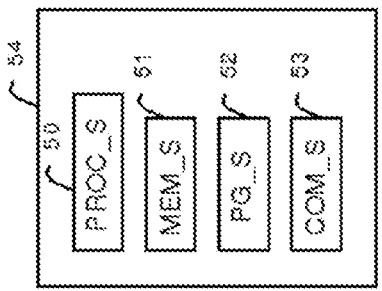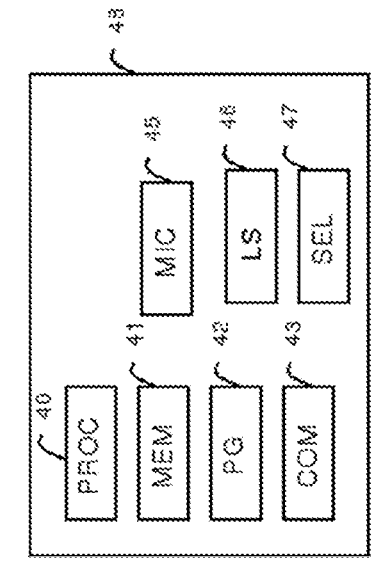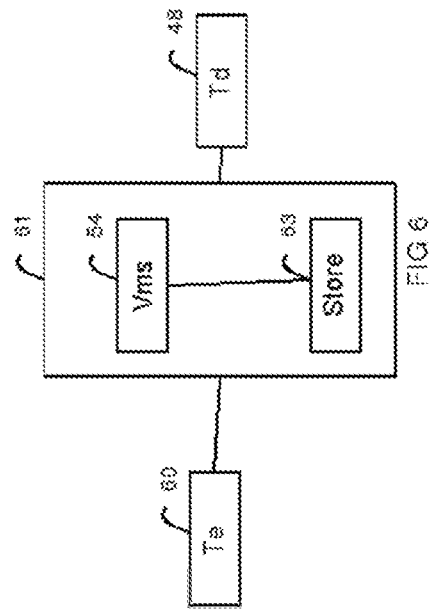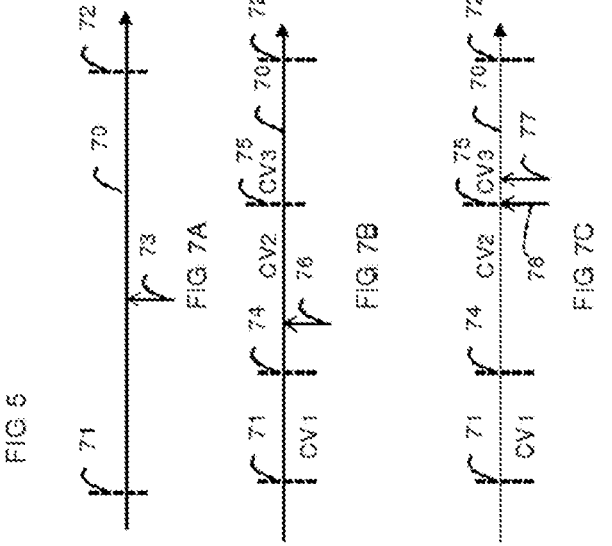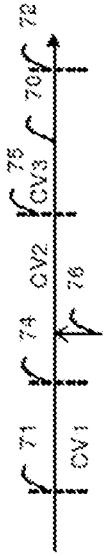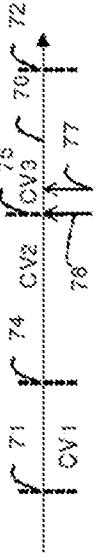

METHOD AND DEVICE FOR CONSULTING A VOICE MESSAGE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure lies in the field of voice messaging. It relates to a device and a method for consulting a voice message.

BACKGROUND OF THE DISCLOSURE

1. Art

A voice messaging service allows a caller to leave a voice message destined for a called party on a messaging server. The called party can thereafter consult either vocally, or visually, the voice messages which have been sent to him.

A voice message may be composed of one or more voice components which have been sent by one or more distinct senders. For example, document EP1117242 A2 proposes a method allowing a called party to send a caller a voice response to a voice message left by the caller. The called party can insert voice components at various locations of the initially received voice message. A server records these voice components and performs an audio editing of a new voice message containing the initially received voice message and the inserted voice components.

2. Drawback of the Prior Art

In the prior art, the compounded voice message composed of several voice components takes the form of a single audio sequence. A recipient user of such a compounded voice message cannot interact in an independent manner with a sender of one of the voice components of the voice message.

Neither does the user have access to information relating to each voice component of the voice message received or to each sender of the voice message.

Thus for a user using a terminal having limited capabilities, for example a terminal with no display means, access to this information is still more complex.

SUMMARY

An illustrative embodiment of the present disclosure makes exemplary improvements with respect to the prior art.

An embodiment of the disclosure relates to a method for consulting a voice message received. The voice message is compounded of at least one first and one second voice component and is associated with a group of items of information relating to the voice components.

The method comprises the steps of reading at least one voice component of the voice message, of detecting at least one user interaction, the user interaction being concomitant upon the reading of the at least one voice component, of sending at least one signal relating to the interaction detected, of receiving a command of an action to be performed relating to a voice component read from the voice message and to at least one item of information of the group of items of information associated with the voice message.

Thus, the user can interact on a voice message that is compounded from any type of terminal, even from a terminal with no display capabilities, or with limited display capabilities. Without the invention, with such a terminal, the user would have to wait for the end of the message in order to be able to interact on this message. Another solution would be to insert the items of information into the voice message by synthesizing them vocally, which would make it lengthy and irksome for the user to listen to the message and would provide him with information which he does not necessarily desire to have.

By virtue of an embodiment of the disclosure, the user may for example at his request and in the course of the reading of the voice message, respond to the sender of a voice component or obtain information relating to the voice component or to its sender.

The various modes or characteristics of embodiment mentioned hereinafter may be added independently or in combination with one another, to the steps of the method for consultation defined hereinabove.

According to a particular embodiment of the disclosure, the action to be performed belongs to a group comprising the reading of a synthesized voice stream stating at least one item of information of the group of items of information associated with a read voice component, the reading of a synthesized voice stream stating the possible actions applicable to the read voice component, the opening of a communication application, the displaying of an interface for selecting a mode of communication to be used to communicate with a sender user who emitted the read voice component, the displaying of an interface for selecting an action applicable to the read voice component.

The disclosure also relates to a method for providing a voice message to a terminal of a recipient user. The voice message is compounded of at least one first and one second voice component and is associated with a group of items of information relating to the voice components. The method comprises the steps of sending at least one voice component of the voice message, of receiving at least one signal relating to an interaction performed by the recipient user, of determining a voice component of the voice message, to which the interaction performed by the recipient user is applied, and of sending a command of an action to be performed by the terminal of the recipient user, relating to the voice component determined and to at least one item of information of the group of items of information associated with the voice message.

The group of items of information associated with the voice message thus makes it possible to distinguish the voice components in the voice message. A user can then interact in an independent manner on at least one voice component of the voice message so as for example to obtain information about this voice component or to respond to a sender of the voice component.

The various modes or characteristics of embodiment mentioned hereinafter may be added independently or in combination with one another, to the steps of the providing method defined hereinabove.

According to a particular embodiment of the disclosure, the method for providing a voice message comprises a step of voice synthesis of at least one item of information of the group of items of information associated with the voice component determined.

The user can thus obtain on request information about a voice component. This information need not therefore be inserted into the voice message in a systematic manner making it lengthy and irksome for the user to listen to the voice message. By virtue of the method for providing according to an embodiment of the disclosure, the user receives only the information that he desires.

According to a particular embodiment of the disclosure, the method for providing a voice message comprises a step of determining a group of actions applicable to the voice component determined.

The user can thus for example be offered possible response modes for a sender of a voice component as a function of the information available for this voice component.

According to a particular embodiment of the disclosure, the signal received relating to an interaction performed by the recipient user corresponds to a DTMF code entered by the recipient user or to an audio signal spoken by the recipient user.

The user thus has simple means of interaction on his terminal while listening to a voice message.

The disclosure also relates to a device for consulting a voice message received. The voice message is compounded of at least one first and one second voice component and is associated with a group of items of information relating to the voice components. The device comprises means for reading at least one voice component of the voice message, means for detecting at least one user interaction concomitant upon the reading of the at least one voice component, means for sending at least one signal relating to the interaction detected, means for receiving a command of an action to be performed relating to a voice component read from the voice message and to at least one item of information of the group of items of information associated with the voice message.

The disclosure also relates to a terminal comprising a consultation device such as described hereinabove.

The disclosure also relates to a device for providing a voice message to a terminal of a recipient user. The voice message is compounded of at least one first and one second voice component and is associated with a group of items of information relating to the voice components. The device comprises means for sending at least one voice component of the voice message, means for receiving at least one signal relating to an interaction performed by the recipient user, means for determining a voice component of the voice message, to which the interaction performed by the recipient user is applied, means for sending a command of an action to be performed by the terminal of the recipient user, relating to the voice component determined and to at least one item of information of the group of items of information associated with the voice message.

The disclosure also relates to a server comprising a providing device such as described hereinabove.

The disclosure also relates to a computer program comprising instructions for the execution of the method for consulting a voice message according to an embodiment of the disclosure, when the program is executed by a processor.

The disclosure also relates to a recording medium readable by a processor on which is recorded a program comprising instructions for the execution of the method for consulting a voice message according to any one of the particular embodiments of the disclosure.

The disclosure also relates to a computer program comprising instructions for the execution of the method for providing a voice message according to the disclosure, when the program is executed by a processor.

The disclosure also relates to a recording medium readable by a processor on which is recorded a program comprising instructions for the execution of the method for providing a voice message according to any one of the particular embodiments of the disclosure.

BRIEF DESCRIPTION OF THE DRAWINGS

Other advantages and characteristics will be more clearly apparent on reading the following description of a particular embodiment of the invention, given by way of simple illustrative and nonlimiting example, and the appended drawings, among which:

FIG. 4 shows the structure of a device implementing the method for consulting a compounded voice message according to a particular embodiment of the disclosure, FIG. 5 shows the structure of a device implementing the method for providing a compounded voice message according to a particular embodiment of the disclosure, FIG. 6 shows an environment for implementing the method for consulting a compounded voice message, FIGS. 7A, 7B and 7C represent in a schematic manner a compounded voice message according to a particular embodiment of the disclosure.

DETAILED DESCRIPTION OF ILLUSTRATIVE EMBODIMENTS

Figure 3:
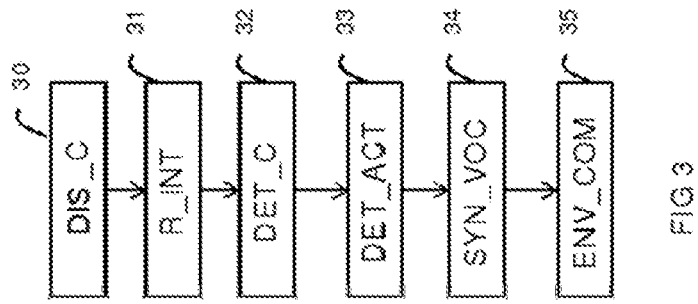
FIG. 3 illustrates steps of the method for providing a compounded voice message implemented by a server according to a particular embodiment of the disclosure.
Figure 3:

An embodiment of the present disclosure allows the consultation and the modification of a compounded voice message composed of at least one voice component sent by at least one sender user.

A method for modifying a compounded voice message allows a recipient user of an initial voice message to modify the initial voice message received so as to add a further voice component to the initial voice message. The recipient of the initial voice message then becomes a sender of the resulting compounded voice message.

The initial voice message may be a voice message comprising only one voice component sent by a single sender user. The initial voice message can also be a compounded voice message comprising more than one voice component sent by one or more different sender users.

The compounded voice message comprises at least one voice component and is associated with a group of items of information. The group of items of information associated with the compounded voice message can for example comprise data associated with a voice component of the compounded voice message. These data can for example be an item of information of position of the voice component in the compounded voice message, an item of information of duration of the voice component, an item of information for time-stamping the creation and/or the last modification of the voice component, an item of information relating to the sender user who emitted the voice component for example an identity, a contact address or a telephone number, a location. The group of items of information can also comprise global data relating to the compounded voice message. For example, these data can correspond to a log of the modifications performed on the compounded voice message.

The disclosure relates to a method for modifying a compounded voice message composed of at least one voice component and a group of items of information associated with the voice message.

The steps of the method for modifying a compounded voice message according to a particular embodiment of the disclosure are illustrated with reference to FIG. 1.

According to a particular embodiment of the disclosure, the method for modifying a voice message may be implemented by a server remote from the user's terminal. This embodiment is particularly advantageous when the user's terminal does not have the capabilities necessary to implement the steps of the method for modifying a voice message and in particular the capabilities to display a voice message.

According to this embodiment, the method for modifying a voice message comprises a step 10 (RMSG1) of receiving a voice message and a group of items of information associated with the voice message by the remote server.

In parallel, the user's terminal receives the voice message and vocally restores the voice message to the user.

The information group associated with the voice message received comprises at least one time-stamping item of information relating to the creation of the voice message. The information group can also comprise other items of information such as that described hereinabove. The voice message received may be a voice message arising from a single sender and unmodified. The voice message received can also be a compounded voice message comprising at least two voice components arising from one or more senders.

After listening to the voice message, the user can decide to insert one or more voice components into the voice message received so as to supplement it or to respond to the sender user or to the sender users who emitted the voice message.

When the user selects the position of insertion of a new voice component into the voice message via for example the sending of a DTMF code (for Dual Tone Multiple Frequency), the remote server triggers the recording (OBT) of the voice component sent by the user, during a step 11.

The user indicates to the remote server the end of the recording of the new voice component for example by sending another DTMF code.

During a step 12, the server updates (UPD) the items of information associated with the voice components of the message and the global items of information associated with the voice message. The server updates in particular the item of information of total duration of the voice message so as to add the duration of the new voice component. The server also updates the position items of information associated with the voice components of the voice message in relation to the position of insertion of the new voice component, in particular the rank of the voice component and the time-marking data indicating the start of the voice component. When a voice component is inserted inside a pre-existing voice component, the pre-existing voice component is split into two voice sub-components and the time-marking data associated with these two voice sub-components are created and/or updated in relation to the position of the new voice component.

The server can also update the items of information relating to the sender of the new voice component and for example obtain location items of information via the geo-location of the terminal thereof.

According to a particular embodiment of the disclosure, the server can create the group of items of information associated with the voice message if these items of information did not exist for the voice message initially received in step 10. The server then determines and stores items of information relating to each voice component of the voice message, for example the duration in seconds of the voice component, the details of the sender of this voice component if they are available, the time-stamp of when the message was initially left. Other items of information may be created such as items of information relating to the voice component itself, for example the corresponding text if a transcription with the aid of a voice recognition functionality is implemented, or if the voice component has been generated from text with the aid of a voice synthesis.

All or some of these items of information may be inserted into the group of items of information associated with the voice message.

According to a particular embodiment of the disclosure, during a step 13 (EDIT), the remote server performs the audio editing of the voice message by concatenating the voice components of the voice message as a function of the items of information of the group of items of information associated with the voice message so as to obtain a single audio sequence comprising the voice components.

During a step 14 (MAV), the server makes available the voice message comprising the voice components of the voice message received and the new voice component as well as the group of items of information associated with the updated voice message. The voice message thus modified is made available to at least one recipient user for example by saving on a server interrogatable by the recipient.

According to the embodiment of the disclosure, the voice message may be stored on a voice messaging server of the recipient in the form of independent audio sequences or in the form of a single audio sequence. The group of items of information can for example be transmitted and stored according to the HTTP protocol (for HyperText Transfer Protocol). The group of items of information associated with the voice message may be stored on the recipient's voice messaging server or on a distinct server. When it is stored on a data server distinct from the server for storing the voice components, the group of items of information then contains at least one reference to the voice message with which it is associated.

The method for modifying a voice message thus makes it possible to create a voice message compounded of at least two voice components and to associate with this voice message items of information making it possible to distinguish the various voice components in the global voice message.

Figure 2:
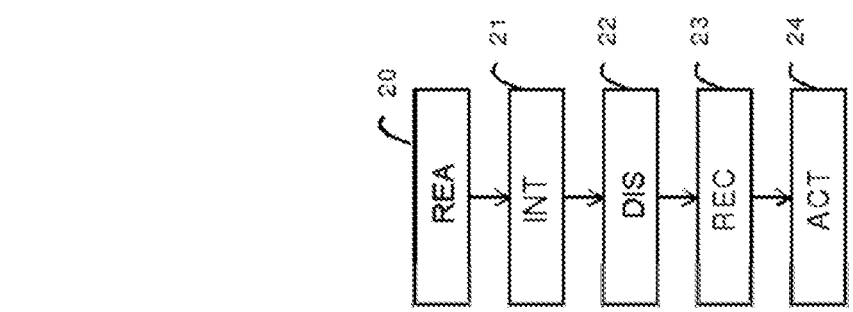
FIG. 2 illustrates steps of the method for consulting a compounded voice message implemented by a terminal according to a particular embodiment of the disclosure.
Figure 2:
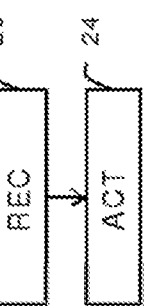

FIG. 2 illustrates steps of the method for consulting a compounded voice message implemented by a terminal according to a particular embodiment of the disclosure.

The terminal of a recipient user addressed by a voice message receives from a voice messaging server, an audio stream comprising the voice components of the voice message.

The user's terminal reads (REA) during a step 20 at least one voice component of the voice message received.

In the course of the reading of the voice component, when the user desires to obtain items of information about the read voice component or to perform an action on the basis of this voice component, he enters for example on the keyboard of his terminal a DTMF code relating to the service which he desires to access for the read voice component.

According to a particular embodiment of the disclosure, the user can articulate a key word relating to the service which he desires to access for the read voice component.

The user's terminal detects (INT) an interaction performed by the user concomitant upon the reading of the voice component during a step 21. The terminal determines the type of interaction performed and sends (DIS) to the messaging server a signal relating to the interaction detected, during a step 22.

For example, the user may have requested items of information about the voice component, these items of information may correspond to the identity of the sender of the voice component, to the time-stamp of the creation of the voice component, to the location of the sender of the voice component. The user may also have requested items of information about the possible means of interaction with the sender of the component or about the actions that it is possible to perform on the basis of the voice component. The user may also have asked to perform an action on the basis of the voice component, for example if he already knows the code or the key word associated with this action. For example, the user may ask to send a response to the sender of the voice component either by inserting a new voice component into the voice message received, or by sending a text message of SMS (for Short Message Service), MMS (for Multimedia Messaging Service) or email type. The user may also ask to transfer the voice component to another recipient, or to delete the voice component of the voice message.

During a step 23, the terminal receives (REC) from the messaging server a command of an action to be executed relating to a voice component read from the voice message and to at least one item of information of the group of items of information associated with the voice message. The terminal executes (ACT) the action received in the command during a step 24.

For example, if the user has asked to obtain items of information about the voice component, the action to be executed by the terminal may correspond to the reading of a synthesized voice stream stating at least one item of information of the group of items of information associated with a read voice component.

According to another particular embodiment of the disclosure, if the user has asked for a list of the possible actions applicable to a read voice component, the action to be executed by the terminal may correspond to the reading of a synthesized voice stream stating the possible actions applicable to the read voice component. The synthesized voice stream may also state the number that the user must enter or the key word that the user must articulate so as to select a corresponding action. During the reading of the voice stream, the server then waits to receive back a response selected by the user.

According to another particular embodiment of the disclosure, the action to be executed by the terminal may also correspond to the displaying of an interface for selecting an action applicable to the voice component. For example, the selection interface prompts the user to respond to a sender of the voice component, to transfer the voice component or the message to a recipient, to delete the voice component, to obtain items of information relating to the voice component. The terminal can thereafter send the action selected by the user to the messaging server so that it implements this action.

According to another particular embodiment of the disclosure, if the user has asked to respond to a sender of the voice component, the action to be executed by the terminal can correspond to the opening of a communication application, for example an application making it possible to send messages of SMS, MMS or email type. As a variant, the action to be executed by the terminal can also correspond to the displaying of an interface for selecting a mode of communication to be used to communicate. For example, the selection interface prompts the user to respond to a sender by SMS, MMS, email or by voice message.

According to another particular embodiment of the disclosure, the action to be executed by the terminal can also correspond to the displaying of an interface for selecting a recipient to which to transfer the voice component.

FIG. 3 illustrates steps of the method for providing a compounded voice message implemented by a server according to another particular embodiment of the disclosure.

After reception of a request to consult a voice message originating from the terminal of a recipient user of the voice message, the voice messaging server sends (DIS_C) at least one voice component of the voice message to the terminal during a step 30.

As a variant, the server also sends a prerecorded voice stream to be read by the terminal so as to inform the user of the terminal of the possible interactions on the voice message read.

As a variant, this voice stream might not be sent systematically to the user on each consultation of his voice messages. The voice stream may for example be broadcast a maximum of 10 times to the user or be rebroadcast only if the user has not heard it for more than a month.

Thereafter during a step 31 the server receives (R_INT) a signal relating to an interaction performed by the recipient user. The server determines on the basis of the signal received which service has been requested by the user.

During a step 32, the server determines (DET_C) the voice component of the voice message to which the interaction performed by the recipient user is applied, on the basis of the group of items of information associated with the voice message. Accordingly, the server measures the instant of interaction of the user on the basis of the instant of reception of the signal received and of the start of the voice message.

With reference to FIG. 7A, the voice message 70 read by the user's terminal is identified at the level of the server by the time markers for the start 71 and end 72 of the message. The duration of the voice message is for example 24 seconds. Upon the sending of the voice message, the server has for example triggered a chronometer. This chronometer is reinitialized to zero at the end of the consultation of each message.

The server receives a user interaction signal at a temporal instant 73 of the voice message corresponding to the position of the chronometer at 10 seconds, during the reception of the user interaction signal.

According to a particular embodiment of the disclosure, the chronometer may be implemented at the level of the user's terminal, the server then receives in addition to the interaction signal an indicator of interaction time in relation to the reading of the voice message.

According to a particular embodiment of the disclosure, the server takes into account a lag due to the response time of the method and/or time to transfer the voice components to the terminal and/or time to transfer the signal from the terminal.

According to another particular embodiment of the disclosure, the server takes into account the user's reaction time.

As a variant, the server can also take into account the time to read the prerecorded audio stream sent before the voice message.

With reference to FIG. 7B, the corrected instant of interaction calculated by the server is then the temporal instant 73 from which a few milliseconds of lag time have been subtracted. The corrected instant of interaction used by the server is then the temporal instant 76 corresponding to the position of the chronometer at 9.5 seconds.

On the basis of this instant of interaction, the server determines the voice component whose time-marking data comprise the instant of interaction. In the example of FIG. 7B, the voice message comprises three voice components CV1, CV2 and CV3 whose temporal bounds are identified by the time markers 71, 74, 75 and 72 corresponding respectively to the temporal positions 0, 4, 14 and 24 seconds. Thus, in this example, the server determines that the temporal instant 76 lies between the temporal positions 74 and 75 and that therefore the user desired to interact on the voice component CV2.

According to a particular embodiment of the disclosure, with reference to FIG. 7C, the user interacts at the temporal instant 77 corresponding to a measured value of 15 seconds of the chronometer. The user interaction occurs within a very short lag after the end of a voice component CV2 lying for example at 14 seconds. The corrected instant of interaction 78 calculated by the server is then positioned at 14.5 seconds. The corrected instant of interaction 78 lies on a time span, for example of 1 second, concomitant with the time spans corresponding to the voice components CV2 and CV3. The server can then ask the user to specify the voice component on which he desired to interact, for example by reviewing an extract to be read by the terminal of the two voice components. As a variant, the server can select one of the two voice components and ask for confirmation from the user.

When the instant of interaction does not correspond to a voice component, for example if the user has interacted after the end of the last component of the voice message, the interaction performed by the user corresponds to an interaction on the global voice message.

The following steps with reference to FIG. 3 apply equally to the voice component determined or to the global voice message according to the result obtained in step 32.

According to a particular embodiment of the disclosure, the server determines (DET_ACT) during a step 33, a group of actions applicable to the voice component determined in step 32. The server establishes the list of possible actions applicable to the voice component determined as a function of the information group associated with the voice message and in particular as a function of the available items of information which are associated with the voice component determined. For example, if the identity of the sender and details for reaching him, such as for example a telephone number, an email address, or else a user identifier of a social network application, are available, the server determines that a possible action is to send a response to the sender of the voice component.

Other possible actions may for example be to transfer the voice component to another recipient if the voice component is not associated with a confidentiality item of information, to delete the voice component of the voice message, to add a voice component. According to another particular embodiment of the disclosure, as a function of the type of details available for the sender of the voice component, the server establishes a list of possible modes of communication in order for the recipient user to communicate with the sender of the voice component.

According to another particular embodiment of the disclosure, during a step 34, the server performs (SYN_VOC) a voice synthesis of the items of information of the group of items of information which are associated with the voice component determined. For example, if the user has asked to obtain items of information about the voice component, the server can thus provide him with an audio stream stating the available items of information, such as for example the identity of the sender, his telephone number. As a variant, when numerous items of information associated with the component are available, the server can implement a method of IVR (for Interactive Voice Response) type so as to ask the user to specify the items of information that he desires to obtain, for example time-stamp, identity, location.

During a step 35, the server sends (ENV_COM) a command of an action to be performed by the terminal of the recipient user. This action is determined as a function of the request performed by the user during the user interaction implemented on his terminal and as a function of the voice component determined.

If the user's request is not authorized or if no item of information associated with the voice component determined is available, the server sends a command relating to the reading of an audio stream stating the impossibility of responding to the user's request.

According to a particular embodiment of the disclosure, if the user has asked to respond to the voice message, the server can send a command to the terminal to establish a communication with the sender of the voice component or of the voice message or to open the SMS or MMS input application by automatically filling in the fields for the opposite party's details.

According to another particular embodiment of the disclosure, the server can implement a method of IVR type to specify to the user the mode of communication with which he desires to respond to the sender.

According to another particular embodiment of the disclosure, the server can implement a method of IVR type to specify to the user which one of the senders of the components of the voice message he desires to communicate with.

According to a particular embodiment of the disclosure, the server thereafter sends a command to resume reading of the voice message whose reading has been interrupted by the user interaction or of the next voice message if the reading of the voice message on which the user has interacted was terminated.

According to another particular embodiment of the disclosure, the server can implement a method of IVR type to ask the user if he desires to resume listening to the interrupted voice message. The resumption of reading of the voice message can resume at the instant at which the user has interacted or a few second before this instant.

As a variant, the resumption of reading of a voice message may be performed at the start of the voice component determined.

FIG. 4 shows the structure of a device 48 implementing the method for consulting a compounded voice message according to a particular embodiment of the disclosure. The device comprises a memory 41 comprising a buffer memory (MEM), a processing unit 40, equipped for example with a processor (PROC), and driven by the computer program (PG) 42, implementing the method for consulting a compounded voice message.

On initialization, the code instructions of the computer program 42 are for example loaded into a RAM memory before being executed by the processor of the processing unit 40. The processor of the processing unit 40 implements the steps of the method for consulting a compounded voice message composed of at least one first and one second voice component and associated with a group of items of information relating to the voice components and in particular the steps of reading at least one voice component of the voice message, of detecting at least one user interaction concomitant upon the reading of the at least one voice component, of sending at least one signal relating to the interaction detected, and of receiving a command of an action to be performed relating to a read voice component from the voice message and to at least one item of information of the group of items of information associated with the voice message, according to the instructions of the computer program 42.

Accordingly, the device comprises, in addition to the buffer memory 41, communication means (COM) 43. These communication means can for example correspond to a network interface allowing the device to connect to a communication network of Internet type or a mobile network or the like.

According to a particular embodiment of the disclosure, the device 48 also comprises acquisition means 45 for acquiring a second voice component spoken by a user such as for example a microphone (MIC) and means of sound restoration 46 of the voice message such as for example a loudspeaker (LS) or a sound output making it possible to connect a headset.

According to another particular embodiment of the disclosure, the device 48 also comprises selection means 47 (SEL) allowing a user to input a code relating to a desired interaction on a read voice component or on the global voice message. These selection means can correspond to the buttons of a keyboard.

The device 48 can for example correspond to a mobile or fixed terminal, or a terminal of smartphone type (intelligent telephone in English) or to a personal computer.

FIG. 5 shows the structure of a device 54 implementing the method for providing a compounded voice message according to a particular embodiment of the disclosure. The device comprises a memory 51 comprising a buffer memory (MEM_S), a processing unit 50, equipped for example with a processor (PROC_S), and driven by the computer program (PG_S) 52, implementing the method for providing a compounded voice message.

On initialization, the code instructions of the computer program 52 are for example loaded into a RAM memory before being executed by the processor of the processing unit 50. The processor of the processing unit 50 implements the steps of the method for providing a compounded voice message composed of at least one first and one second voice component and associated with a group of items of information relating to the voice components and in particular the steps of sending at least one voice component of the voice message, of receiving at least one signal relating to an interaction performed by the recipient user, of determining a voice component of the voice message, to which the interaction performed by the recipient user is applied, of sending a command of an action to be performed by the terminal of the recipient user, relating to the voice component determined and to at least one item of information of the group of items of information associated with the voice message, according to the instructions of the computer program 52.

Accordingly, the device comprises, in addition to the buffer memory 51, communication means (COM_S) 53. These communication means can for example correspond to a network interface allowing the device to connect to a communication network of Internet type or a mobile network or the like.

The device 54 can for example correspond to a data processing server, such as for example a voice messaging server.

FIG. 6 shows an environment for implementing the method for consulting a compounded voice message according to a particular embodiment of the disclosure.

Figure 1:
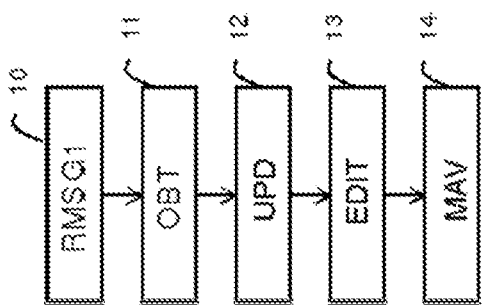
FIG. 1 illustrates steps of a method for modifying a compounded voice message according to a particular embodiment of the disclosure.

The terminal 60 (Te) can for example correspond to the terminal of a sender user implementing the method for modifying a compounded voice message such as described in FIG. 1. On receipt of a voice message, the user of the terminal 60 modifies this message for example by adding a voice component and sends it to the user of a terminal 48 (Td). While waiting for the user to consult the modified message, the compounded voice message is stored on a messaging system 61.

According to the embodiment, the messaging system can comprise a voice messaging server 54 (Vms) allowing a user to access the voice messages of which he is the recipient.

The messaging server 54 can for example store an item of information indicating that a compounded voice message is stored for this recipient. The various voice components and the information group associated with the compounded voice message may be stored on a storage server 63 (Store) which the server 54 accesses when the terminal 48 sends a request to consult messages received.

The server 54 determines that the voice message is a message composed of several voice components and is associated with an information group. The server 54 then implements the method for providing a compounded voice message as described in the disclosure.

The server 54 transmits the compounded voice message to the terminal 48. The terminal 48 then implements the method for consulting a compounded voice message as described in the disclosure.

Although the present disclosure has been described with reference to one or more examples, workers skilled in the art will recognize that changes may be made in form and detail without departing from the scope of the disclosure and/or the appended claims.

The invention claimed is:

1. A method for consulting a received compounded voice message wherein the method comprises the following steps implemented at least in part by a processor of a terminal:
    reading at least one voice component of said compounded voice message from a messaging server, wherein the compounded voice message comprises at least two voice components, and the compounded voice message is associated with a group of items of information relating to the voice components, the group of items of information being configured to enable the voice components in the compounded voice message to be distinguished by the messaging server;
    detecting at least one user interaction concomitant upon the reading of the at least one voice component of the compounded voice message, the user interaction applying to a particular one of the voice components of the compounded voice message;
    sending to said messaging server at least one signal relating to the user interaction detected, the at least one signal being configured to enable the messaging server to determine, among said at least two voice components, the particular voice component to which the user interaction applies on the basis of said signal and said group of items of information associated with the compounded voice message;
    receiving from the messaging server a command of an action to be performed by said terminal, said action being a function of the particular voice component determined by said messaging server and a function of at least one item of information of the group of items of information associated with the compounded voice message; and
    initiating the action by the terminal in response to the command received from the messaging server.

2. The method for consulting a compounded voice message according to claim 1, wherein the action to be performed belongs to a group consisting of:

reading a synthesized voice stream stating at least one item of information of the group of items of information associated with a read voice component, reading a synthesized voice stream stating the possible actions applicable to the read voice component, displaying of an interface for selecting a mode of communication to be used to communicate with a sender user who emitted the read voice component, displaying of an interface for selecting an action applicable to the read voice component.

3. A method for providing a compounded voice message to a terminal of a recipient user, the method comprising the following steps implemented at least in part by a processor:

sending at least one voice component of the compounded voice message to the terminal, wherein the compounded voice message comprises at least two voice components and the compounded voice message is associated with a group of items of information relating to the voice components, the items of information being configured to enable the voice components in the compounded voice message to be distinguished by a messaging server;

receiving from the terminal at least one signal relating to an interaction performed by the recipient user applying to a particular one of the voice components of the compounded voice message;

determining among said at least two voice components of the compounded voice message the particular voice component to which the interaction performed by the recipient user is applied on the basis of said signal and said group of items of information associated with the compounded voice message; and sending to the terminal a command of an action to be performed by the terminal of the recipient user, said action being determined by said messaging server as a function of the particular voice component determined by said messaging server and as a function of at least one item of information of the group of items of information associated with the compounded voice message.

4. The method for providing a compounded voice message according to claim 3, comprising a step of voice synthesis of at least one item of information of the group of items of information associated with the particular voice component determined.

5. The method for providing a compounded voice message according to claim 3, comprising a step of determining a group of actions applicable to the particular voice component determined, said group of actions being determined as a function of the group of items of information associated with the compounded voice message.

6. The method for providing a compounded voice message according to claim 3, wherein the signal received relating to an interaction performed by the recipient user corresponds to a DTMF code entered by the recipient user or to an audio signal spoken by the recipient user.

7. A device for consulting a compounded voice message received, the device comprising:

means for reading at least one voice component of the compounded voice message from a messaging server, wherein the compounded voice message comprises at least two voice components, and the compounded voice message is associated with a group of items of information relating to the voice components, the group of items of information being configured to enable the voice components in the compounded voice message to be distinguished by the messaging server;

means for detecting at least one user interaction concomitant upon the reading of the at least one voice component of the compounded voice message, the user interaction applying to a particular one of the voice components of the compounded voice message;

means for sending to the messaging server at least east one signal relating to the user interaction detected, the at least one signal being configured to enable the messaging server to determine, among said at least two voice components the particular voice component to which the user interaction applies on the basis of said signal and said group of items of information associated with the compounded voice message;

means for receiving from the messaging server a command of an action to be performed by said device, said action being a function of said particular voice component determined by said messaging server and as a function of at least one item of information of the group of items of information associated with the compounded voice message; and means for initiating the action by the terminal in response to the command received from the messaging server.

8. A terminal comprising a device according to claim 7.

9. A device for providing a compounded voice message to a terminal of a recipient user, the device comprising:

means for sending at least one voice component of the compounded voice message to the terminal, wherein the compounded voice message comprises at least two voice components and the compounded voice message is associated with a group of items of information relating to the voice components, the items of information being configured to enable the voice components in the compounded voice message to be distinguished by a messaging server;

means for receiving from the terminal at least one signal relating to an interaction performed by the recipient user applying to a particular one of the voice components of the compounded voice message;

means for determining among said at least two voice components the particular voice component to which the interaction performed by the recipient user is applied on the basis of said signal and said group of items of information associated with the compounded voice message, and means for sending to the terminal a command of an action to be performed by the terminal of the recipient user, said action being determined by said messaging server as a function of the particular voice component determined by said messaging server and as a function of at least one item of information of the group of items of information associated with the compounded voice message.

10. A Server comprising a device according to claim 9.

11. A non-transitory computer-readable medium comprising a computer program recorded thereon and comprising instructions for execution of a method for consulting a compounded voice message received, when the program is executed by a processor, wherein the method comprises the following steps implemented by the processor of a terminal:

reading at least one voice component of the compounded voice message from a messaging server, wherein the compounded voice message comprises at least two voice components, and the compounded voice message is associated with a group of items of information relating to the voice components, the group of items of information being configured to enable the voice components in the compounded voice message to be distinguished by the messaging server;

detecting at least one user interaction concomitant upon the reading of the at least one voice component of the compounded voice message, the user interaction applying to a particular one of the voice components of the compounded voice message;

sending to said messaging server at least one signal relating to the user interaction detected, the at least one signal being configured to enable the messaging server to determine, among said at least two voice components, the particular voice component to which the user interaction applies on the basis of said signal and said group of items of information associated with the compounded voice message, receiving a command from the messaging server, command of an action to be performed by said terminal, said action being a function of said particular voice component determined by said messaging server and a function of at least one item of information of the group of items of information associated with the compounded voice message; and initiating the action by the terminal in response to the command received from the messaging server.

12. A non-transitory computer-readable medium comprising a computer program recorded thereon and comprising instructions for execution of a method for providing a compounded voice message to a terminal of a recipient user, the method comprising the following steps implemented by the processor:

sending at least one voice component of the compounded voice message to the terminal, wherein the compounded voice message comprises at least two voice components and the compounded voice message is associated with a group of items of information relating to the voice components, the items of information being configured to enable the voice components in the compounded voice message to be distinguished by a messaging server;

receiving from the terminal at least one signal relating to an interaction performed by the recipient user applying to a particular one of the voice components of the compounded voice message;

determining, among said at least two voice components, the particular voice component of the compounded voice message to which the interaction performed by the recipient user is applied on the basis of said signal and said group of items of information associated with the compounded voice message, and sending to the terminal a command of an action to be performed by the terminal of the recipient user, said action being determined by said messaging server as a function of the particular voice component determined and as a function of at least one item of information of the group of items of information associated with the compounded voice message.

* * * * *